(12) United States Patent
Tsubaki

(10) Patent No.: US 9,670,708 B2
(45) Date of Patent: Jun. 6, 2017

(54) WIRE HARNESS ROUTING STRUCTURE

(71) Applicant: Yazaki Corporation, Tokyo (JP)

(72) Inventor: Akira Tsubaki, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/058,455

(22) Filed: Mar. 2, 2016

(65) Prior Publication Data

US 2016/0257268 A1    Sep. 8, 2016

(30) Foreign Application Priority Data

Mar. 2, 2015  (JP) ................................. 2015-039850
Jan. 26, 2016  (JP) ................................. 2016-012490

(51) Int. Cl.
| | |
|---|---|
| *H02G 3/04* | (2006.01) |
| *E05D 15/28* | (2006.01) |
| *B60J 5/06* | (2006.01) |
| *B60R 16/027* | (2006.01) |
| *H02G 11/00* | (2006.01) |
| *E05F 15/646* | (2015.01) |

(52) U.S. Cl.
CPC ............... *E05D 15/28* (2013.01); *B60J 5/06* (2013.01); *B60R 16/027* (2013.01); *E05F 15/646* (2015.01); *H02G 11/00* (2013.01); *E05Y 2400/654* (2013.01); *E05Y 2900/531* (2013.01)

(58) Field of Classification Search
CPC ...... B60R 16/0215; B60R 16/027; B60J 5/06; H02G 11/00; E05D 15/28
USPC .......................................................... 174/72 A
See application file for complete search history.

(56) References Cited

U.S. PATENT DOCUMENTS

| | | | |
|---|---|---|---|
| 7,265,294 B2* | 9/2007 | Tsunoda ................. | H02G 11/00 174/135 |
| 2005/0264033 A1* | 12/2005 | Aoki .................... | B60R 16/0215 296/155 |
| 2010/0089642 A1* | 4/2010 | Aoki ...................... | H02G 11/00 174/72 A |
| 2011/0114779 A1* | 5/2011 | Tsubaki .............. | B60R 16/0215 242/372 |

FOREIGN PATENT DOCUMENTS

JP          2000-177508 A      6/2000

* cited by examiner

*Primary Examiner* — Sherman Ng
(74) *Attorney, Agent, or Firm* — Locke Lord LLP

(57) ABSTRACT

Provided is a power supply device for supplying power to a slide door via a wire harness, in which the wire harness is arranged invisible, which can improve bending durability of the wire harness with respect to sliding action of the slide door, and which can be used for the wire harness for multicircuit. In the power supply device, the wire harness is routed from a slide door arm through inside a slide door rail, through a roller and a guide plate and to a case. All the time during the operation of the slide door from a fully-opened state to a fully-closed state of the slide door, the wire harness is stored in a groove of the slide door rail or in the case.

12 Claims, 12 Drawing Sheets

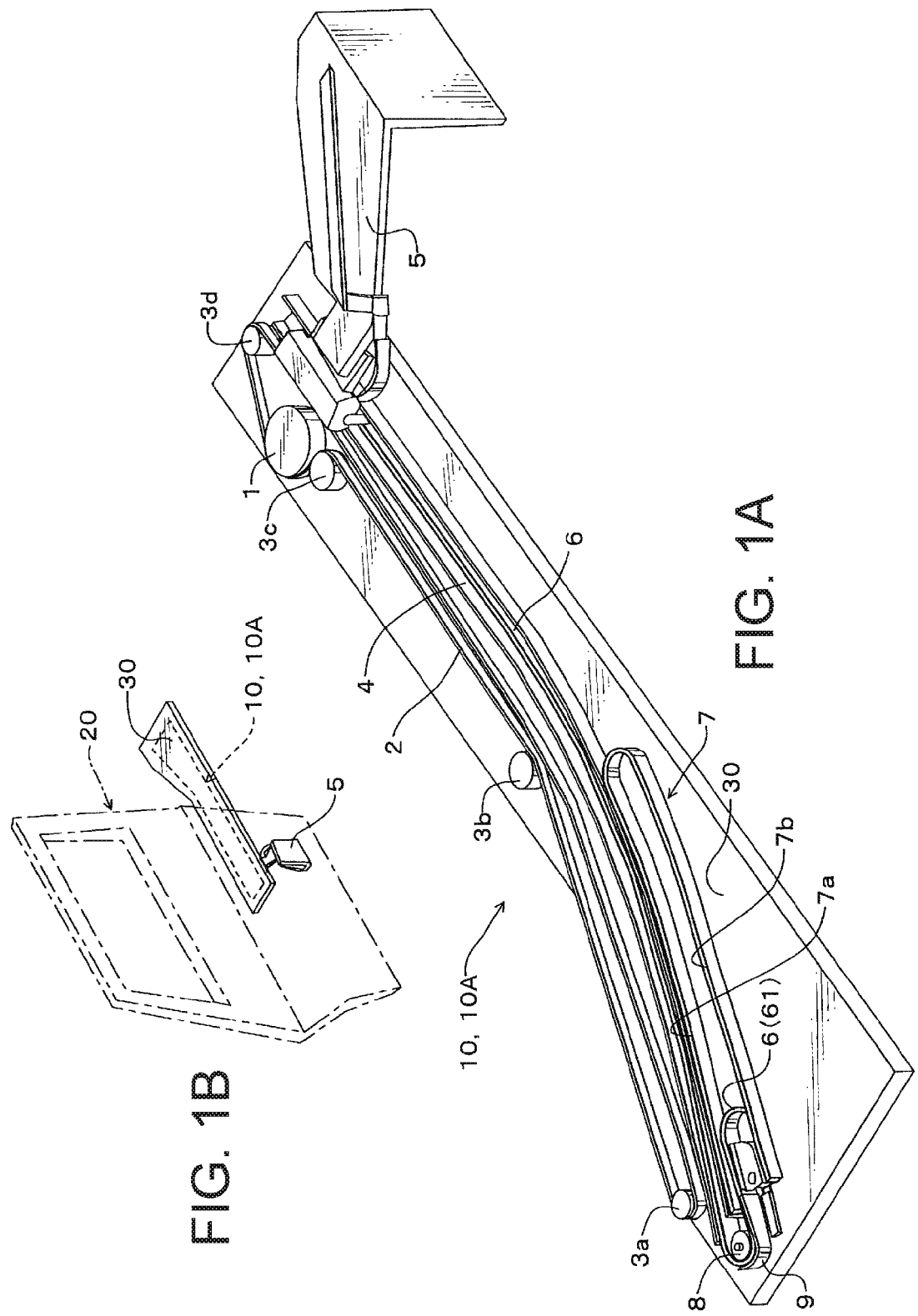

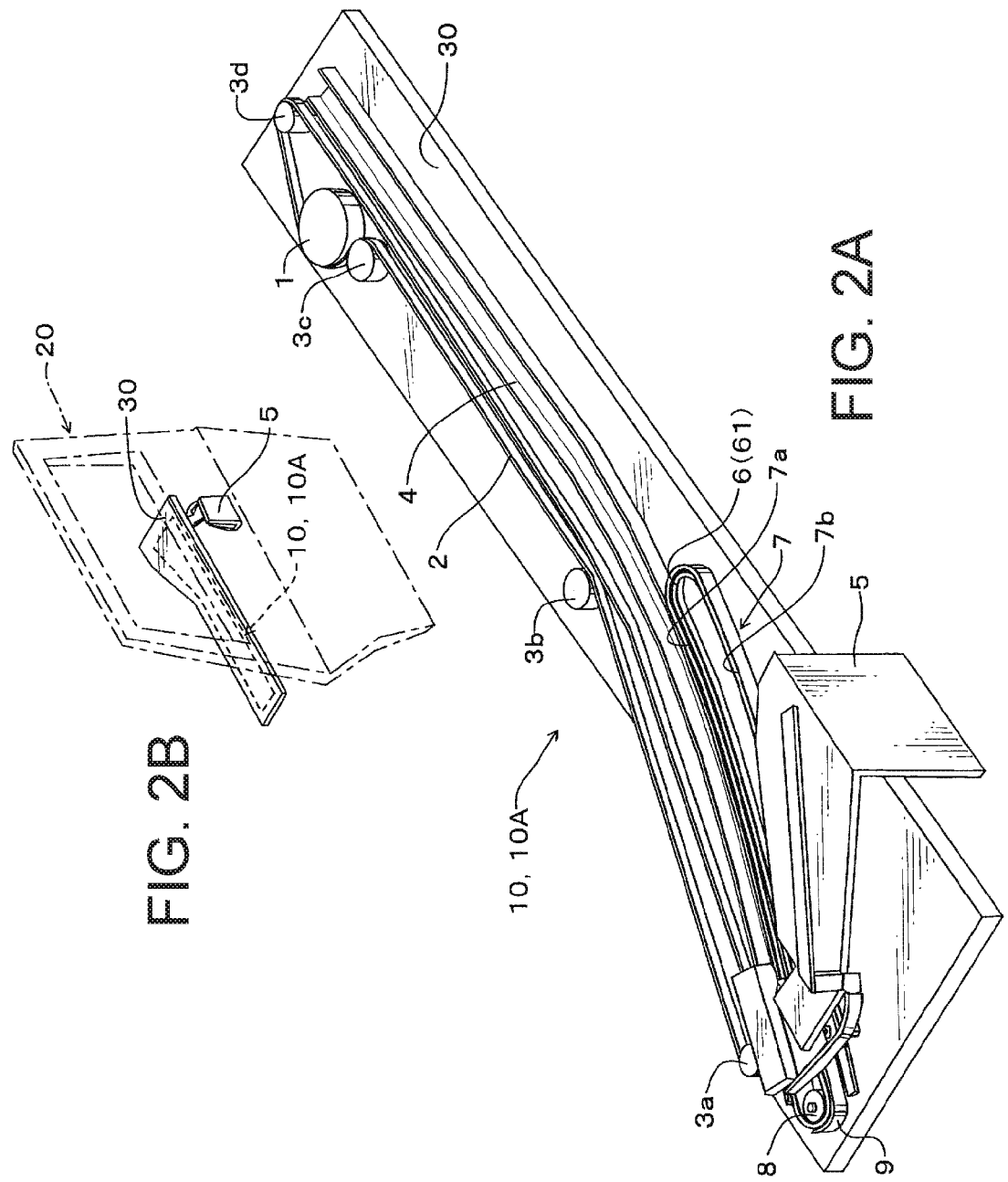

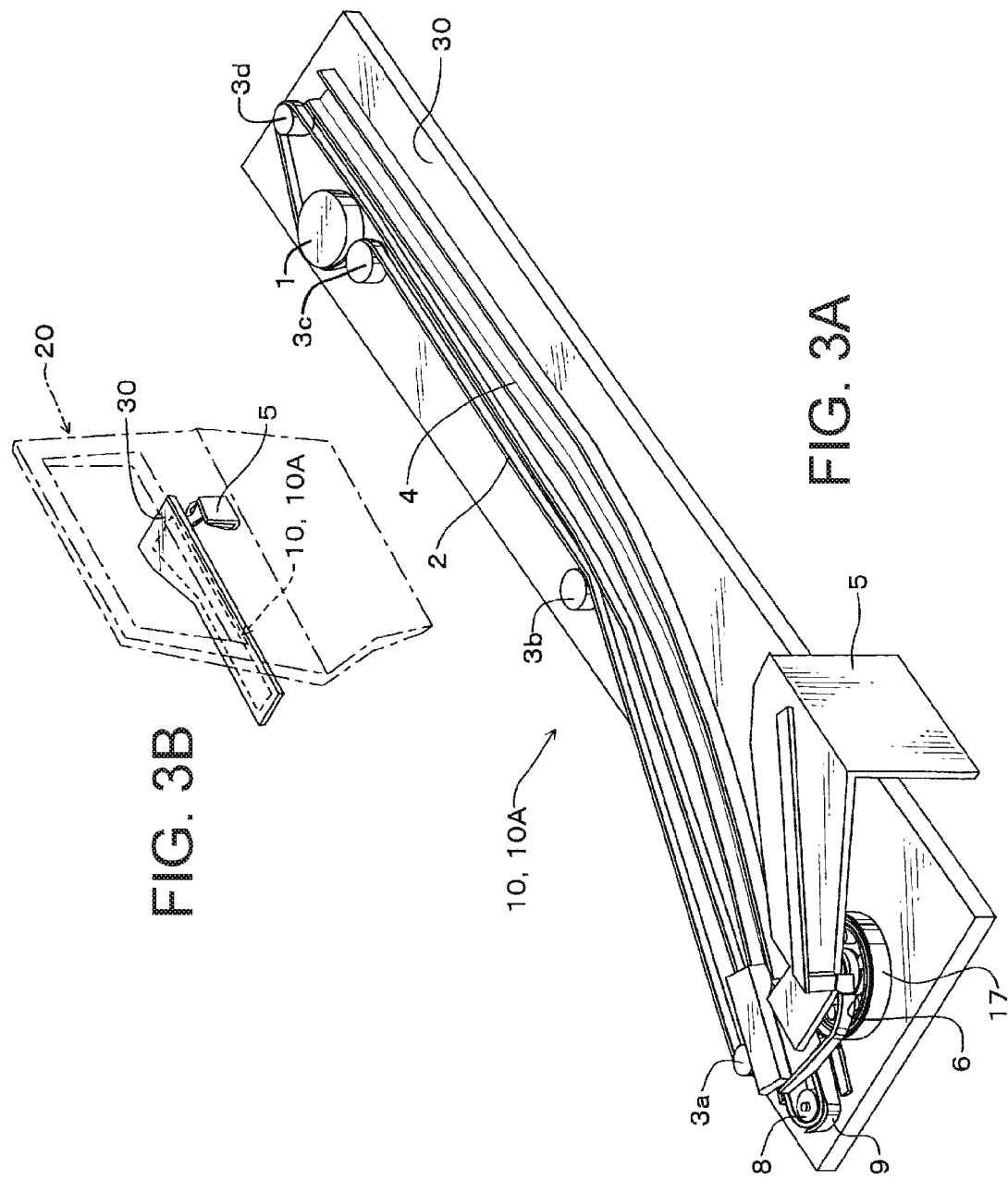

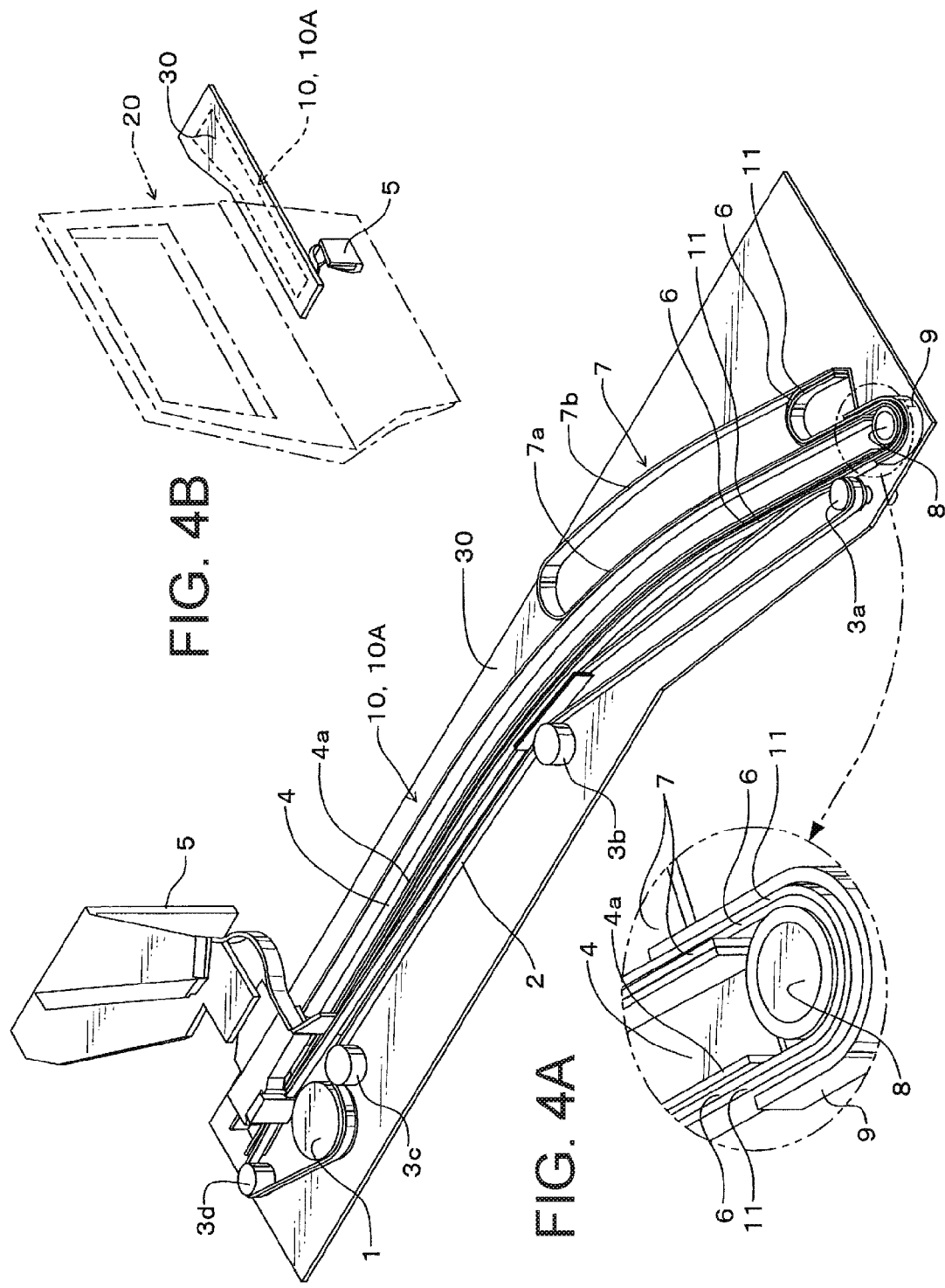

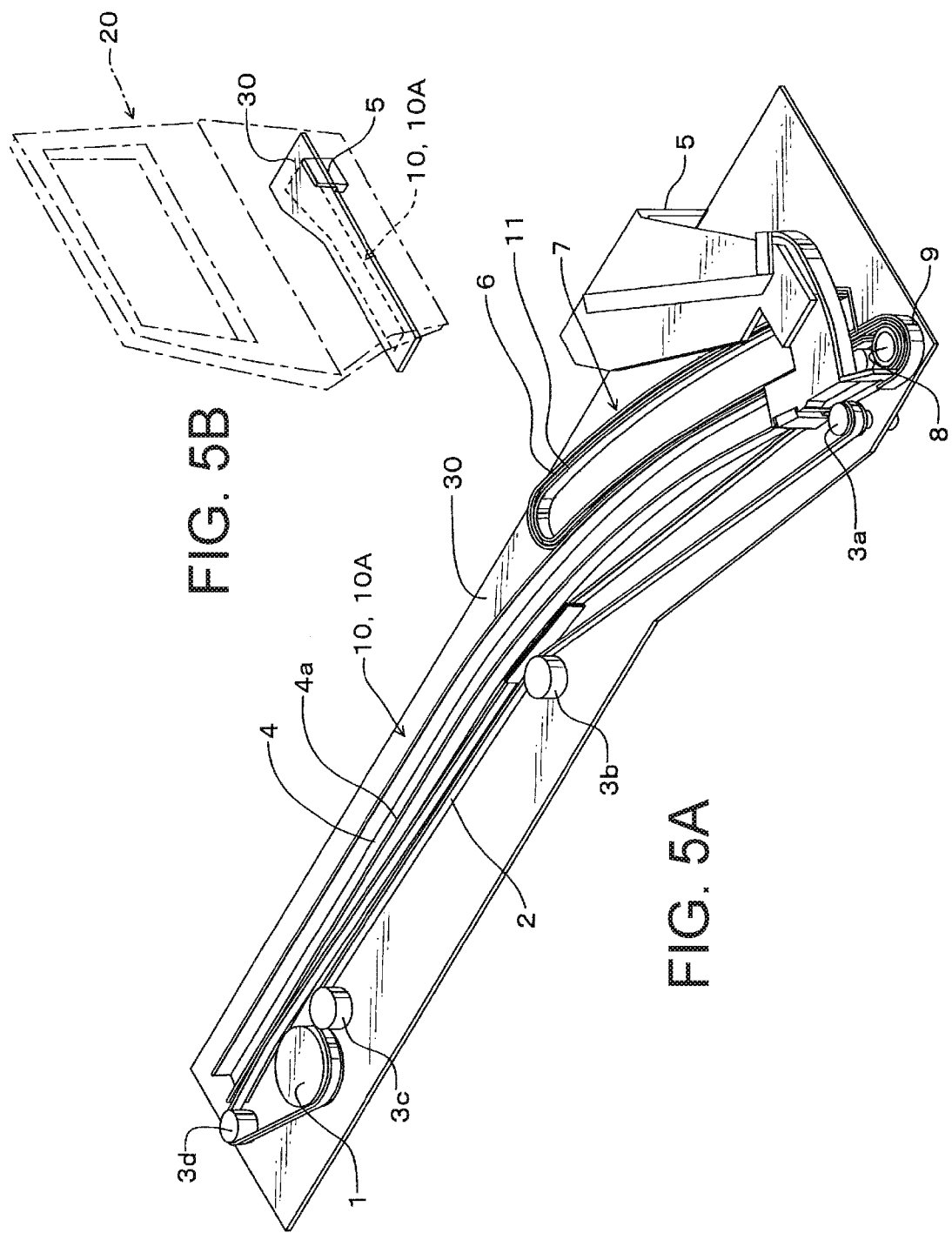

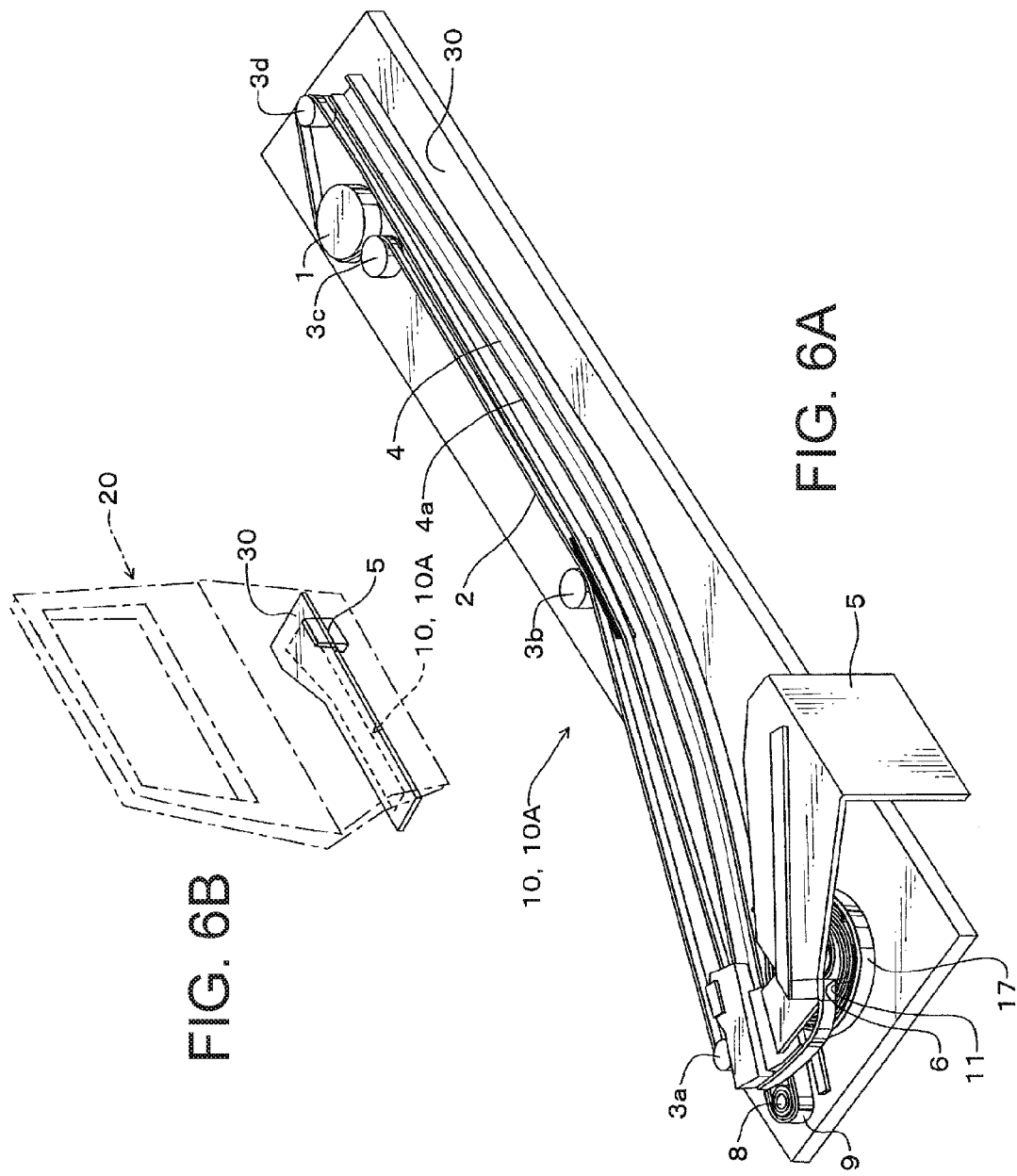

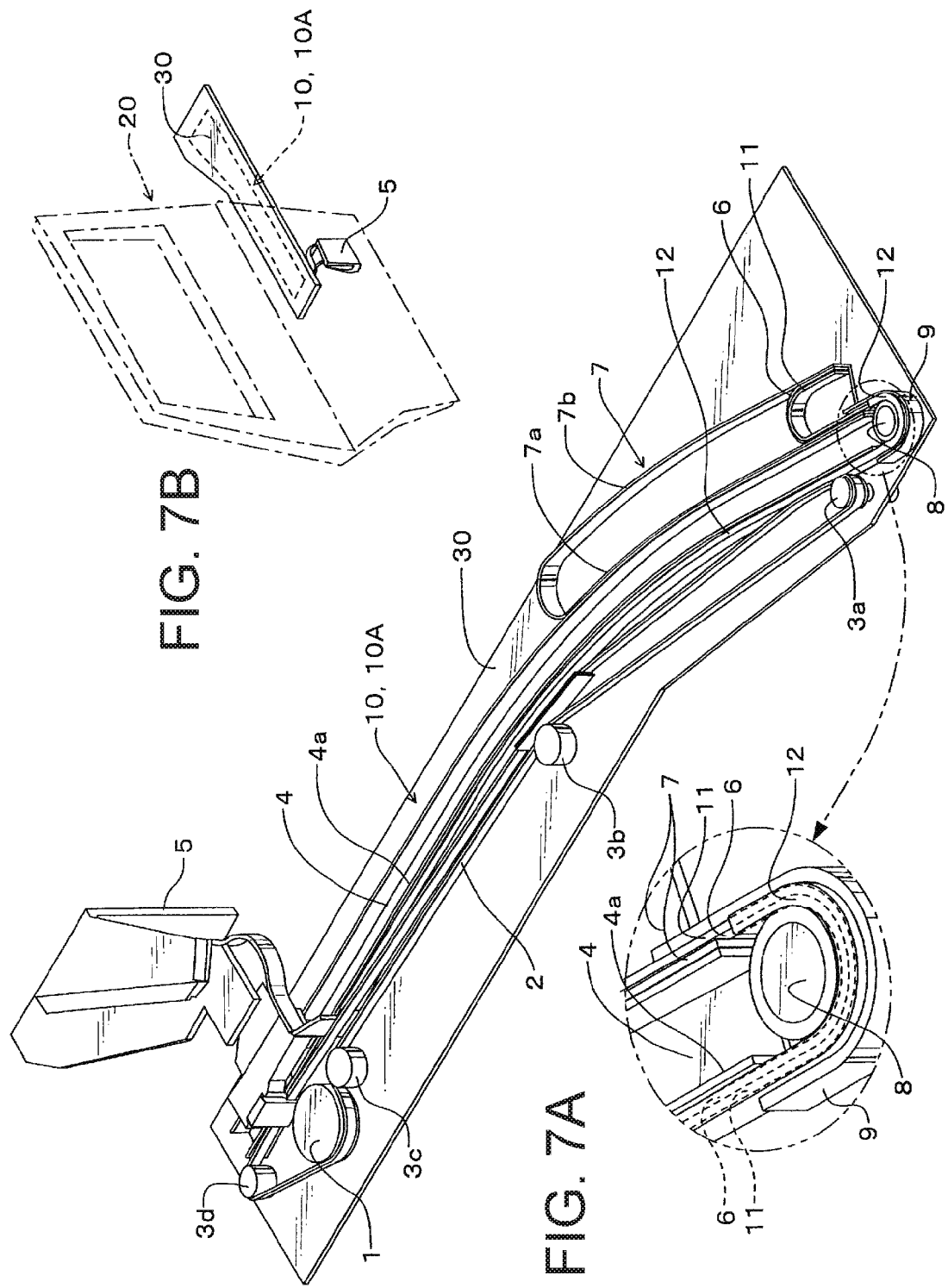

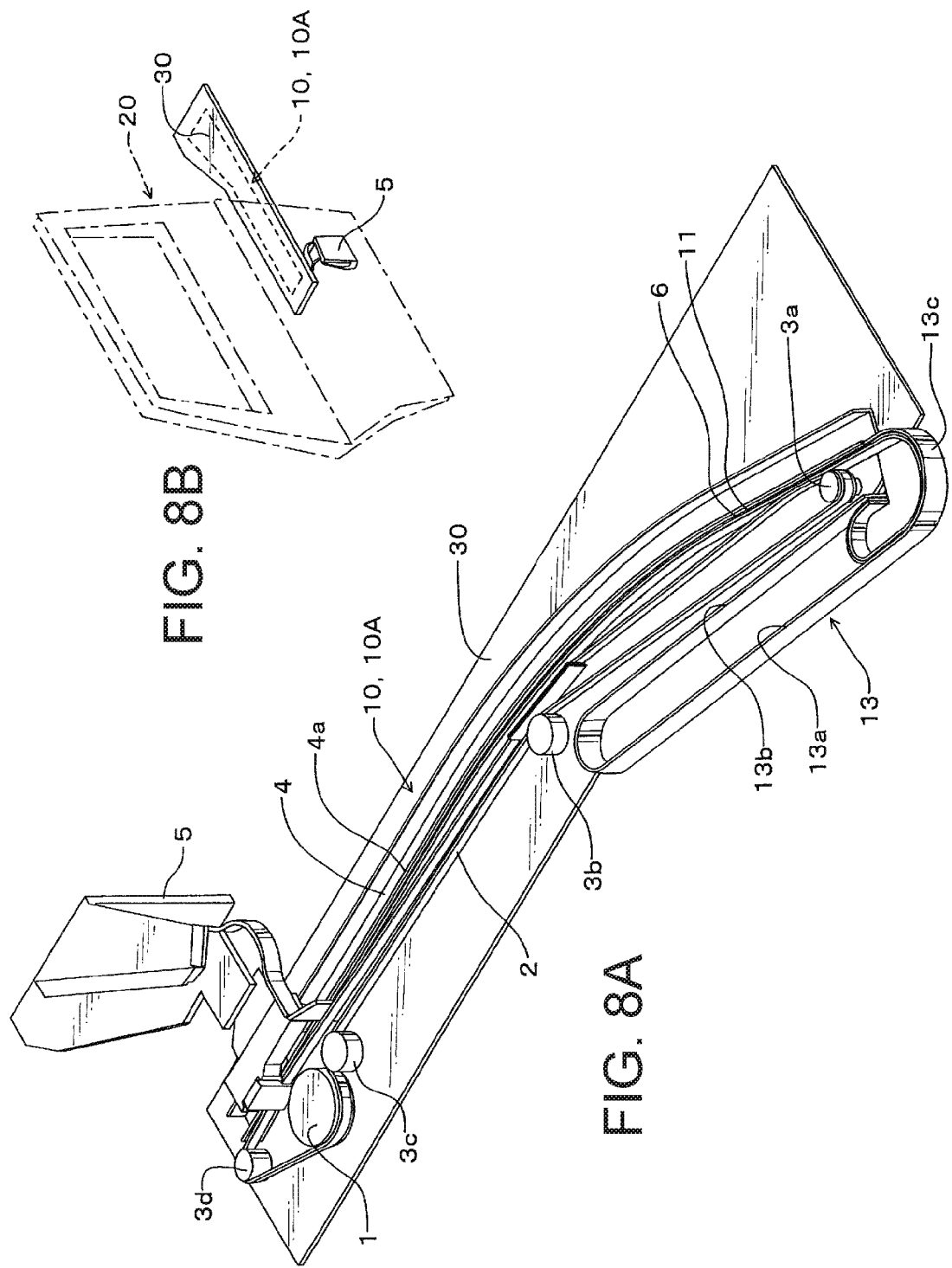

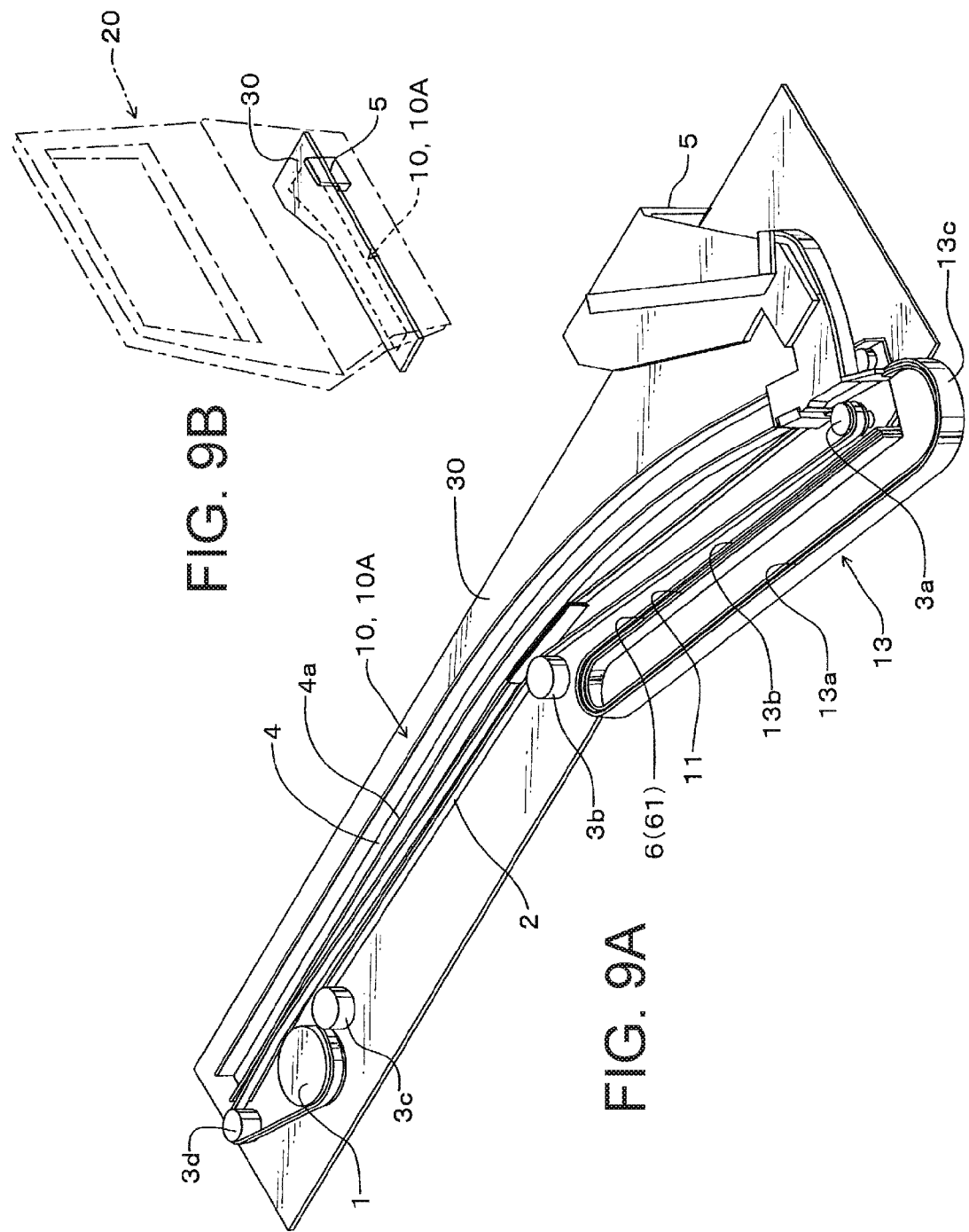

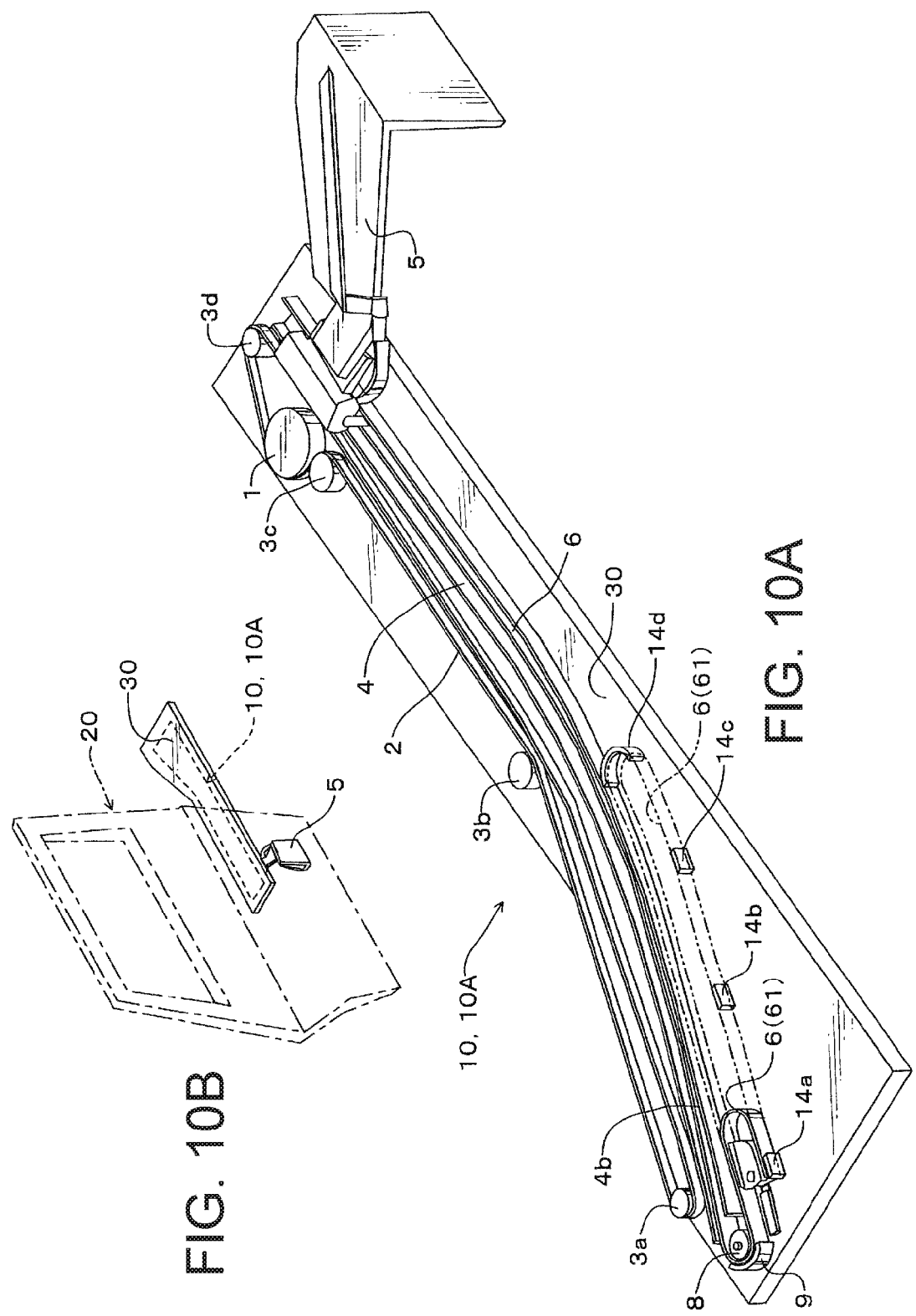

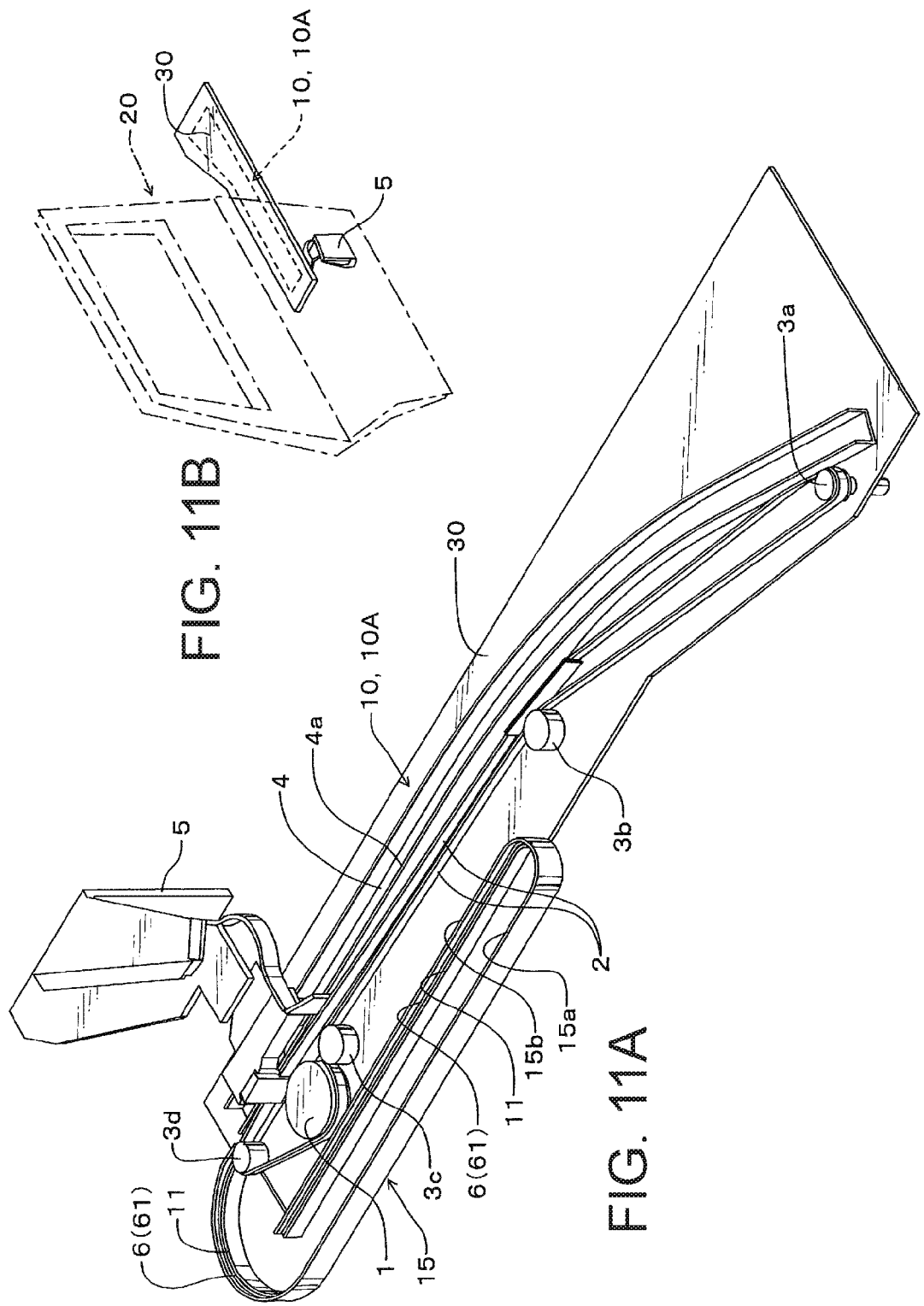

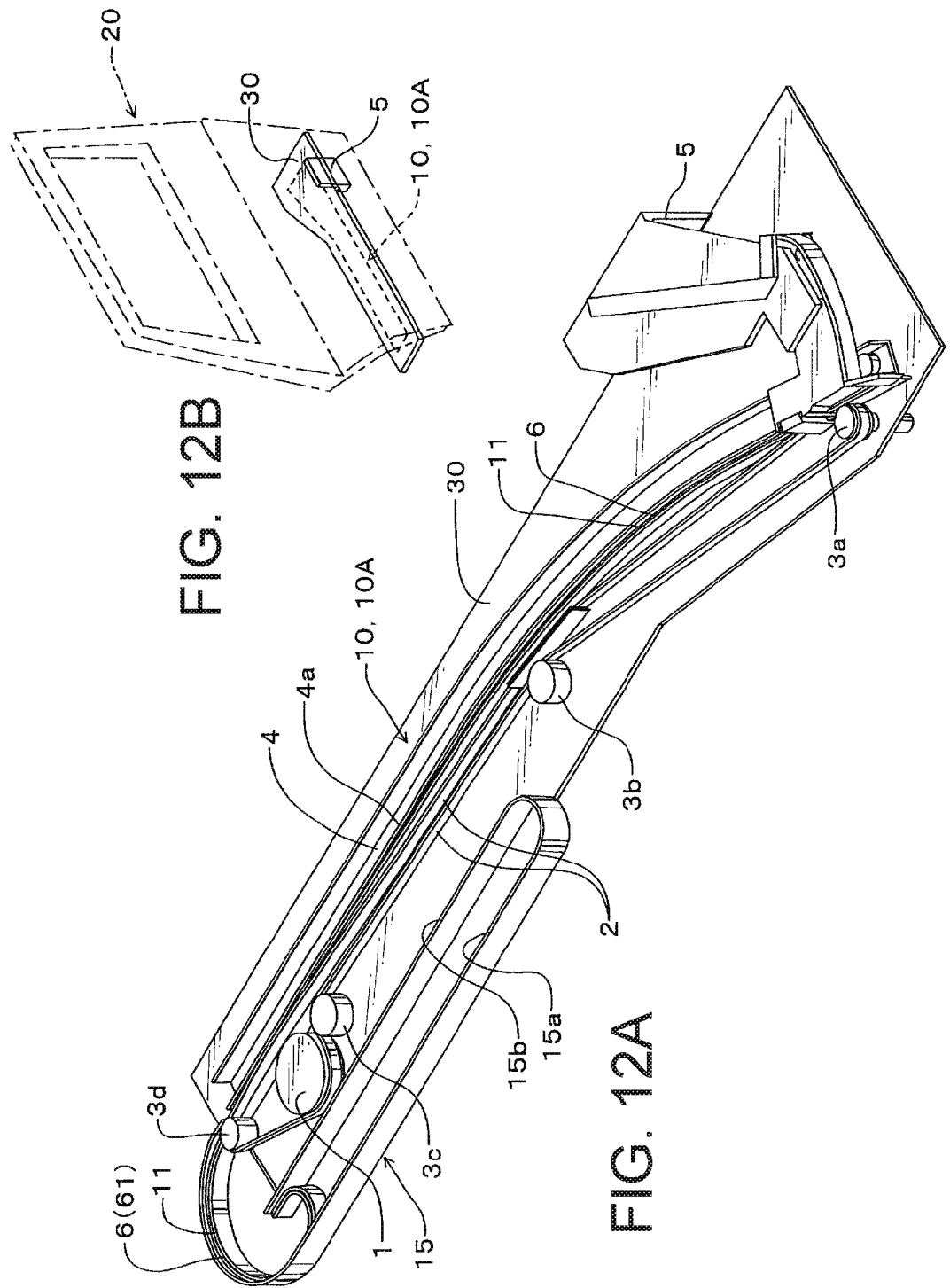

WIRE HARNESS ROUTING STRUCTURE

CROSS REFERENCE TO RELATED APPLICATIONS

This application is on the basis of Japanese Patent Application No. 2016-012490, the contents of which are hereby incorporated by reference.

TECHNICAL FIELD

The present invention relates to a wire harness routing structure for a power supply system supplying power to a sliding door and such of a vehicle via a wire harness.

BACKGROUND ART

A slide door used for a vehicle is embedded with electric components such as a power window motor. To supply power to these electric components, it is necessary to provide a wire harness (a wire) routed from a vehicle body to the slide door, such that this wire harness can follow the opening and closing operation of the slide door.

Meanwhile, Japanese Patent Application Publication No. 2000-177508 (hereinafter, "Patent Literature 1"), for example, discloses a mechanism for continuously supplying power including a wire harness for a slide door which is arranged in an invisible manner. Specifically, Patent Literature 1 discloses a flexible conductor that is provided with a band-like steel plate having a recessed surface with a U-shaped cross section to regulate the movement of the flexible conductor, and the flexible conductor is routed under a vehicle step where a passenger cannot see.

However, the conventional art disclosed in Patent Literature 1 has following drawbacks. That is, if the number of the flexible conductors is increased with an increase in number of circuits (due to multicircuit), the rigidity of the conductors becomes larger than the rigidity of the band-like steel plate. As a result, it is difficult to maintain the routing path which is formed into a U-shape for space saving, for example. Moreover, the routing path of the flexible conductors may extend outward causing the flexible conductors to interfere with other components, or the flexible conductors may be bent locally causing a decrease in durability of the flexible conductors.

Patent Literature 1: Japanese Patent Application Publication No. 2000-177508

SUMMARY OF INVENTION

In view of the above-described drawbacks, it is an object of the present invention to provide a wire harness routing structure which can prevent breaking of a wire harness, which can improve visual quality by invisibly-arranging the wire harness, which can improve bending durability of the wire harness with respect to sliding action of a slide door, and which can be used for the wire harness for multicircuit.

In order to achieve the above-described object, the present invention provides, according to a first aspect, a wire harness routing structure for a power supply system supplying power to a slide door via a wire harness, including the wire harness, a groove-like slide door rail configured to guide a slide movement of the slide door, a base member to which the slide door rail is attached, a slide door arm connecting the slide door and the slide door rail, and an extra length absorbing portion configured to store an extra length portion of the wire harness produced by the slide movement of the slide door, wherein the extra length absorbing portion is disposed on the base member and adjacent to the slide door rail, wherein the wire harness is routed from the slide door arm along the slide door rail to the extra length absorbing portion.

According to a second aspect of the invention, the wire harness is routed from the slide door arm through inside a groove of the slide door rail to the extra length absorbing portion.

According to a third aspect of the invention, the wire harness is routed from the slide door arm through a side surface of the slide door rail, and the wire harness routing structure includes a support member arranged along the wire harness at a side opposite to the side surface of the slide door rail.

According to a fourth aspect of the invention, the wire harness routing structure according to the third aspect further includes a bundling member arranged along the wire harness and configured to bundle the wire harness and the support member together.

According to a fifth aspect of the invention, the wire harness according to any one of the first to fourth aspects is curved inside the case and stored in the case.

According to a sixth aspect of the invention, the wire harness according to any one of the first to third aspects is rewound inside the case and stored in the case.

According to a seventh aspect of the invention, the base member is disposed under a door step.

According to the inventions described in the first to eighth aspects, all the time during the operation of the slide door from the fully-opened state to the fully-closed state, the wire harness is positioned along the slide door rail, or positioned in the groove of the slide door rail, or stored in the case. Thus, a passenger cannot see or contact with the wire harness, thereby preventing the passenger from stepping on the wire harness and preventing the breakage of the wire harness. Furthermore, if the rigidity of the wire harness is increased due to an increase in number of circuits, the trajectory of the wire harness can be reliably restricted by the slide door rail and the case, thereby addressing the increase in number of circuits. Furthermore, the wire harness is prevented from being applied with unnecessary tension, thereby improving the bending durability.

BRIEF DESCRIPTION OF DRAWINGS

FIGS. 1A and 1B show perspective view of a power supply device and a slide mechanism employing a wire harness routing structure according to a first embodiment of the present invention, in which a slide door is in a fully-opened state;

FIGS. 2A and 2B show perspective view of the power supply device and the slide mechanism employing the wire harness routing structure according to the first embodiment of the present invention, in which the slide door is in a fully-closed state;

FIGS. 3A and 3B show perspective view of a power supply device and a slide mechanism employing a wire harness routing structure according to a second embodiment of the present invention, in which a slide door is in a fully-closed state;

FIGS. 4A and 4B show perspective view of a power supply device and a slide mechanism employing a wire harness routing structure according to a third embodiment of the present invention, in which a slide door is in a fully-opened state;

FIGS. 5A and 5B show perspective view of the power supply device and the slide mechanism employing the wire harness routing structure according to the third embodiment of the present invention, in which the slide door is in a fully-closed state;

FIGS. 6A and 6B show perspective view of a power supply device and a slide mechanism employing a wire harness routing structure according to a fourth embodiment of the present invention, in which a slide door is in a fully-closed state;

FIGS. 7A and 7B show perspective view of a power supply device and a slide mechanism employing a wire harness routing structure according to a fifth embodiment of the present invention, in which a slide door is in a fully-opened state;

FIGS. 8A and 8B show perspective view of a power supply device and a slide mechanism employing a wire harness routing structure according to a sixth embodiment of the present invention, in which a slide door is in a fully-opened state;

FIGS. 9A and 9B show perspective view of the power supply device and the slide mechanism employing the wire harness routing structure according to the sixth embodiment of the present invention, in which the slide door is in a fully-closed state;

FIGS. 10A and 10B show perspective view of a power supply device and a slide mechanism employing a wire harness routing structure according to a seventh embodiment of the present invention, in which a slide door is in a fully-closed state;

FIGS. 11A and 11B show perspective view of a power supply device and a slide mechanism employing a wire harness routing structure according to an eighth embodiment of the present invention, in which a slide door is in a fully-opened state; and FIGS. 12A and 12B show perspective view of the power supply device and the slide mechanism employing the wire harness routing structure according to the eighth embodiment of the present invention, in which the slide door is in a fully-closed state.

DESCRIPTION OF EXEMPLARY EMBODIMENTS

In the following, an exemplary embodiment of the present invention is explained with reference to the drawings. FIGS. 1A and 1B show perspective view of a power supply device and a slide mechanism employing a wire harness routing structure according to a first embodiment of the present invention, in which a slide door is in a fully-opened state. FIGS. 2A and 2B show perspective view of the power supply device and the slide mechanism employing the wire harness routing structure according to the first embodiment of the present invention, in which the slide door is in a fully-closed state.

A power supply device 10 according to the first embodiment is employed in a slide mechanism 10A for opening and closing a slide door 20 of a vehicle. The power supply device 10 and the slide mechanism 10A are mounted to an under side (lower side) of a base 30 as "base member" provided to an under side of a door step of the vehicle. The door step (i.e., under side of the door step) itself may be the base 30 as "base member". The slide mechanism 10A includes the slide door 20 arranged to slide with respect to the base 30, a sprocket 1 which outputs rotational power by a rotational power source, a drive belt 2 which extends in a slide direction of the slide door 20 and transmits the rotational power from the rotational power source to the slide door 20 as slide force, a plurality of pulleys 3 (3a, 3b, 3c, 3d) configured to extend the drive belt 2 throughout the device, a slide door rail 4 which extends in a front-rear direction of the vehicle and which is slightly curved, and a slide door arm 5 connecting the slide door 20 and the slide door rail 4. The slide door rail 4 is a groove-type rail having a U-shaped cross section, i.e., the slide door rail 4 has a groove. A portion of the slide door arm 5 is slidably-retained in the above-mentioned U-shaped groove of the slide door 4. The slide door arm 5 is connected to the drive belt 2.

As shown in FIG. 1A, the drive belt 2 is a loop and is extended between the pulley 3a provided at a front side of the vehicle, the pulley 3d provided at a rear side of the vehicle, the sprocket 1, the pulley 3c, and the pulley 3b. Thus, the drive belt 2 is provided to extend substantially in the front-rear direction of the vehicle so as to extend in the slide direction of the slide door 20.

The power supply device 10 includes a wire harness 6 for supplying power to the slide door 20, a case 7 as "extra length absorbing portion" which stores an extra length portion 61 corresponding to a loosening of the wire harness 6, a roller 8 arranged adjacent to one side end portion of the slide door 4, and a guide plate 9 which surrounds the roller 8 to guide the wire harness 6 to the case 7.

The wire harness 6 is a flexible flat harness composed of a plurality of electric wires (not shown), and one end of the wire harness 6 is fixed to the slide door arm 5 and is connected to the slide door 20 via a connector not shown. The other end of the wire harness 6 is connected to a floor side (i.e., battery side) of the vehicle by a connector not shown via the case 7.

The case 7 if formed into a longitudinal shape and has a substantially cuboid or rectangular housing. The case 7 is provided adjacent to an end of the slide door rail 4 at the vehicle front side (at the roller 8 side).

The wire harness 6 is routed from the slide door arm 5 through the groove of the slide door rail 4, and is turned around the roller 8 so as to be routed through a path between the roller 8 and the guide plate 9 disposed near one side of the slide door rail 4. The wire harness 6 is routed within the case 7 via the guide plate 9. The wire harness 6 (i.e., the extra length portion 61) in the case 7 is curved in a U-shaped fashion by being sandwiched between side plates 7a, 7b on both sides of the case 7, and the end of the wire harness 6 (the extra length portion 61) is fixed to the side plate 7b on one side of the case 7.

The following will explain operation of the major parts during closing the slide door 20 from its fully-opened state shown in FIGS. 1A-1B. This operation includes rotation and movement of the major parts. Firstly, the sprocket 1 is rotated in a positive direction by the rotational power source, and the side of the drive belt 2 adjacent to the slide door arm 5 starts to move toward the front side of the slide door 20 (i.e., the front side of the vehicle). At the same time, the slide door arm 5 also moves, so the wire harness 6 fixed to the slide door arm 5 is guided by the roller 8 and the guide plate 9 and moved into the case 7, so the wire harness 6 is pushed into the case 7. Then, the slide door 20 becomes in its fully-closed state as shown in FIGS. 2A-2B. In this fully-closed state, most of the wire harness 6 (i.e., the extra length portion 61) is stored in the case 7.

When opening the slide door 20 from its fully-closed state shown in FIGS. 2A-2B, the sprocket 1 is rotated in the negative direction (reverse direction) by the rotational power source, and the side of the drive belt 2 adjacent to the slide door arm 5 starts to move toward the rear side of the slide door 20 (i.e., the rear side of the vehicle). At the same time, the slide door arm 5 also moves, so the wire harness 6 fixed to the slide door arm 5 is drawn out from the case 7. Then, the slide door 20 becomes in its fully-opened state as shown in FIGS. 1A-1B. In this fully-opened state, most of the wire harness 6 is stored in the slide door rail 4.

As described above, the wire harness 6 is stored in the groove of the slide door rail 4 or in the case 7 during the operation of the slide door 20 from the fully-opened state to the fully-closed state of the slide door 20. Thus, a passenger cannot see or contact with the wire harness 6 at all time. In addition, the slide door rail 4 is located at under side of the base 30, thereby preventing the passenger from stepping on the wire harness 6.

FIGS. 3A-3B show perspective view of a power supply device and a slide mechanism employing a wire harness routing structure according to a second embodiment, in which a slide door is in a fully-closed state. In the second through eighth embodiments described below, elements similar to those in the first embodiment are denoted by the same reference signs used in FIGS. 1A, 1B, 2A and 2B to eliminate similar explanation thereof, unless otherwise noted. In this second embodiment also, a wire harness 6 is routed from a slide door arm 5 through a groove of a slide door rail 4, and is turned around a roller 8 so as to be routed through a path between the roller 8 and a guide plate 9 disposed near one side of the slide door rail 4. In the second embodiment, a circular case 17 is provided as the case as "extra length absorbing portion" for storing the wire harness 6. The wire harness 6 is rewound in the case 17. Specifically, the wire harness 6 may be rewound around a tubular member provided in the case 17 by rotating the tubular member by a coil spring or by the power of the drive belt 2. Regardless of the shape of the case, the extra length portion of the wire harness 6 drawn inside the case may be folded in an S-shaped fashion.

FIGS. 4A-4B show perspective view of a power supply device and a slide mechanism employing a wire harness routing structure according to a third embodiment, in which a slide door is in a fully-opened state. FIGS. 5A and 5B show perspective view of the power supply device and the slide mechanism employing the wire harness routing structure according to the third embodiment, in which the slide door is in a fully-closed state. In FIG. 4A, a portion circled with dotted line is a partial enlarged view. In this third embodiment, a wire harness 6 is routed from a slide door 5 along an outer side surface 4a of a slide door rail 4, as shown in FIG. 4A. Furthermore, in the third embodiment, there is provided a support member 11 disposed along the wire harness 6 at a side opposite to the side surface 4a. The support member 11 is formed of a plastic plate or a metal plate or the like. One end of the wire harness 6 and one end of the support member 11 are fixed to the slide door arm 5.

The wire harness 6 and the support member 11 extend from a slide door arm 5 along the side surface 4a of the slide door rail 4, and are turned around a roller 8 so as to be arranged between the roller 8 and a guide plate 9 disposed near one side of the slide door rail 4. Furthermore, the wire harness 6 and the support member 11 are routed within the case 7 as "extra length absorbing portion" via the guide plate 9. The wire harness 6 and the support member 11 in the case 7 are curved in a U-shaped fashion by being sandwiched between side plates 7a, 7b on both sides of the case 7, and the ends of the wire harness 6 and the support member 11 are fixed to the side plate 7b on one side of the case 7.

In this third embodiment also, the wire harness 6 is arranged along the side surface 4a of the slide door rail 4 or stored in the case 7 during operation of the slide door 20 from the fully-opened state shown in FIGS. 4A-4B to the fully-closed state shown in FIGS. 5A-5B. Thus, a passenger cannot see or contact with the wire harness 6 at all time. In addition, the slide door rail 4 is located at under side of the base 30, and the wire harness 6 is arranged along the side surface 4a of the slide door rail 4, thereby preventing the passenger from stepping on the wire harness 6. Moreover, in the third embodiment, the wire harness 6 is sandwiched between the support member 11 and the side surface 4a of the slide door rail 4, thereby preventing the wire harness 6 from being locally curved during the operation of the slide door 20 from the fully-opened state to the fully-closed state.

FIGS. 6A and 6B show perspective view of a power supply device and a slide mechanism employing a wire harness routing structure according to a fourth embodiment, in which a slide door is in a fully-closed state. Similar to the second embodiment, the fourth embodiment is provided with a circular case 17 ("extra length absorbing portion") for storing a wire harness 6. Furthermore, the fourth embodiment is arranged such that the wire harness 6 and a support member 11 are rewound in the case 17. Similar to the second embodiment, the wire harness 6 and the support member 11 may be rewound around a tubular member provided in the case by rotating the tubular member by a coil spring or by the power of the drive belt 2.

FIGS. 7A and 7B show perspective view of a power supply device and a slide mechanism employing a wire harness routing structure according to a fifth embodiment, in which a slide door is in a fully-opened state. In FIG. 7A, the portion circled with the dotted line is a partial enlarged view. In addition to the structure according to the third embodiment, the fifth embodiment is provided with a bundling member 12. The bundling member 12 is a tubular member made of resin, for example, and is configured to pass the wire harness 6 and the support member 11 inside the bundling member 12 to partially cover circumferences of the wire harness 6 and the support member 11. The bundling member 12 bundles the wire harness 6 and the support member 11 together, thereby reducing the frictional force between the wire harness 6 and the slide door rail 4, and thereby reducing the load in operation of the slide door 20. Furthermore, the noise can be reduced. In this fifth embodiment also, the wire harness 6 is arranged along the side surface 4a of the slide door rail 4 or stored in the case 7 as "extra length absorbing portion". Thus, a passenger cannot see or contact with the wire harness 6 at all time. Also, the wire harness 6 is prevented from being stepped on the passenger. In addition, although in the fifth embodiment the bundling member 12 is provided only to an entrance of the case 7, the bundling member 12 may extend to inside of the case 7. Furthermore, although the bundling member 12 described above is tubular in shape, the bundling member 12 may have any shape unless it can hold the wire harness 6 and the support member 11 together.

FIGS. 8A and 8B show perspective view of a power supply device and a slide mechanism employing a wire harness routing structure according to a sixth embodiment, in which a slide door is in a fully-opened state. FIGS. 9A and 9B show perspective view of the power supply device and the slide mechanism employing the wire harness routing structure according to the sixth embodiment, in which the slide door is in a fully-closed state. The sixth embodiment is an alternative example based on the third embodiment, and provides, in place of the case 7 of the third embodiment, a case 13 as "extra length absorbing portion" disposed at a side opposite to the slide door rail 4. In other words, the case 13 is disposed at the vehicle front side of the slide door rail 4 such that the pulley 3a is sandwiched between the slide door rail 4 and the case 13.

As shown in FIGS. 8A-8B, the wire harness 6 and the support member 11 extend from the slide door arm 5 along the side surface 4a of the slide door rail 4, and are routed in the case 13 via an arc-like guide portion 13c of the case 13. Ends of the wire harness 6 and the support member 11 are fixed to a side plate 13b on one side of the case 13. As shown in FIGS. 9A-9B, when the slide door is in the fully-closed state, the wire harness 6 (i.e., the extra length portion 61) and the support member 11 in the case 13 are stored such that the wire harness 6 and the support member 11 are curved into a U-shaped fashion by being sandwiched between the side plates 13a, 13b on both sides of the case 13.

In this sixth embodiment also, the wire harness 6 is arranged along the side surface 4a of the slide door rail 4 or stored in the case 13 during the operation of the slide door 20 from the fully-opened state shown in FIGS. 8A-8B to the fully-closed state shown in FIGS. 9A-9B. Thus, a passenger cannot see or contact with the wire harness 6. In addition, the slide door rail 4 is located at under side of the base 30, and the wire harness 6 is arranged along the side surface 4a of the slide door rail 4, thereby preventing the passenger from stepping on the wire harness 6. Moreover, in the sixth embodiment also, the wire harness 6 is sandwiched between the support member 11 and the side surface 4a of the slide door rail 4, thereby preventing the wire harness 6 from being locally curved during the operation of the slide door 20 from the fully-opened state to the fully-closed state.

FIGS. 10A and 10B show perspective view of a power supply device and a slide mechanism employing a wire harness routing structure according to a seventh embodiment, in which a slide door is in a fully-closed state. In these drawings, two-dot chain line indicates the wire harness 6 (i.e., extra length portion 61) in the fully-closed state of the slide door. The seventh embodiment is an alternative example based on the first embodiment, and provides, in place of the case 7 of the first embodiment, wall members 14a, 14b, 14c arranged apart from each other and arranged at a position corresponding to the side plate 7b of the case 7 mentioned in the first embodiment, while providing an arc-like wall member 14d at a position corresponding to the end of the case 7 of the first embodiment. These wall members 14a, 14b, 14c, 14d are one example of the "extra length absorbing portion".

The wire harness 6 is routed from the slide door arm 5 through the groove of the slide door rail 4, and is turned around the roller 8 so as to be routed through a path between the roller 8 and the guide plate 9. Furthermore, the wire harness 6 is disposed between the side surface 4b of the slide door rail 4 and the wall member 14a, and an end of the wire harness 6 is fixed to the wall member 14a. When the slide door is in the fully-closed state, the wire harness 6 (i.e., the extra length portion 61) is curved into a U-shaped fashion by being sandwiched between the side surface 4b of the slide door rail 4 and the wall members 14a, 14b, 14c, 14d. In such manner, the wire harness 6 is routed and stored at an under side (lower side) of the base 30.

In this seventh embodiment also, the wire harness 6 is disposed in the groove of the slide door rail 4 or stored between the side surface 4b of the slide door rail 4 and the wall members 14a, 14b, 14c, 14d during the operation of the slide door 20 from the fully-opened state shown to the fully-closed state of the slide door 20. Thus, a passenger cannot see or contact with the wire harness 6. In addition, the slide door rail 4 is located at under side of the base 30, thereby preventing the passenger from stepping on the wire harness 6.

FIGS. 11A and 11B show perspective view of a power supply device and a slide mechanism employing a wire harness routing structure according to an eighth embodiment, in which a slide door is in a fully-opened state. FIGS. 12A and 12B show perspective view of the power supply device and the slide mechanism employing the wire harness routing structure according to the eighth embodiment, in which the slide door is in a fully-closed state. This eighth embodiment is an alternative example based on the sixth embodiment, and provides, in place of the case 13 of the sixth embodiment, a case 15 as "extra length absorbing portion" disposed adjacent to the other end of the slide door rail 4. In other words, the case 15 is disposed at the vehicle rear side of the slide door rail 4 such that the sprocket 1 is sandwiched between the case 15 and the slide door rail 4.

As shown in FIGS. 12A-12B corresponding to the fully-closed state of the slide door, the wire harness 6 and the support member 11 extend from the slide door arm 5 along the side surface 4a of the slide door rail 4, and are routed in the case 15 via an arc-like guide portion 15c of the case 15. Ends of the wire harness 6 and the support member 11 are fixed to a side plate 15b on one side of the case 15. As shown in FIGS. 11A-11B, when the slide door 20 is in the fully-opened state, the wire harness 6 (i.e., the extra length portion 61) and the support member 11 in the case 15 are stored such that the wire harness 6 and the support member 11 are curved into a U-shaped fashion by being sandwiched between the side plates 15a, 15b on both sides of the case 15.

In such manner, in the eighth embodiment, the extra length portion 61 (and the support member 11) formed in the fully-opened state of the slide door 20 is stored in the case 15.

In this eighth embodiment also, the wire harness 6 is arranged along the side surface 4a of the slide door rail 4 or is stored in the case 15 during the operation of the slide door 20 from the fully-opened state shown in FIGS. 11A-11B to the fully-closed state shown in FIGS. 12A-12B of the slide door 20. Thus, a passenger cannot see or contact with the wire harness 6 at all time. In addition, the slide door rail 4 is located at under side of the base 30, and the wire harness 6 is routed along the side surface 4a of the slide door rail 4, thereby preventing the passenger from stepping on the wire harness 6. Moreover, in the eighth embodiment also, the wire harness 6 is sandwiched between the support member 11 and the side surface 4a of the slide door rail 4, thereby preventing the wire harness 6 from being locally curved during the operation of the slide door 20 from the fully-opened state to the fully-closed state.

The first to fifth embodiments are provided with the roller 8, thus the wire harness 6 can be easily delivered into the extra length absorbing portion. However, this roller 8 may be omitted.

The embodiments described herein are only representative embodiments of the present invention and are not intended to limit the present invention. That is, the shown embodiments can be modified or changed in various ways without departing from the spirit and scope of the present invention.

LIST OF CITED REFERENCES 10 power supply device
20 slide door (slide body)
10A slide mechanism 30 base (base member)
1 sprocket
2 drive belt
3 pulley
4 slide door rail
5 slide door arm
6 wire harness
7 case (extra length absorbing portion)
8 roller
9 guide plate
11 support member
12 bundling member
13 case (extra length absorbing portion)
14a, 14b, 14c, 14d wall member (extra length absorbing portion)
15 case (extra length absorbing portion)

The invention claimed is:

1. A wire harness routing structure for a power supply system supplying power to a slide door via a wire harness, comprising:
   the wire harness;
   a groove-like slide door rail configured to guide a slide movement of the slide door;
   a base member to which the slide door rail is attached;
   a slide door arm connecting the slide door and the slide door rail; and
   an extra length absorbing portion configured to store an extra length portion of the wire harness produced by the slide movement of the slide door,
   wherein the extra length absorbing portion is disposed on the base member and adjacent to the slide door rail,
   wherein regardless of a position of the slide door, the wire harness is routed from the slide door arm along the slide door rail and through an end portion of the slide door rail to the extra length absorbing portion in a case.

2. The wire harness routing structure according to claim 1, wherein the wire harness is routed from the slide door arm through inside a groove of the slide door rail to the extra length absorbing portion.

3. The wire harness routing structure according to claim 1, wherein the wire harness is routed from the slide door arm through a side surface of the slide door rail, and
   wherein the wire harness routing structure includes a support member arranged along the wire harness at a side opposite to the side surface of the slide door rail.

4. The wire harness routing structure according to claim 3, further including a bundling member arranged along the wire harness and configured to bundle the wire harness and the support member together.

5. The wire harness routing structure according to claim 1, wherein the wire harness is curved inside the case and stored in the case.

6. The wire harness routing structure according to claim 2, wherein the wire harness is curved inside the case and stored in the case.

7. The wire harness routing structure according to claim 3, wherein the wire harness is curved inside the case and stored in the case.

8. The wire harness routing structure according to claim 4, wherein the wire harness is curved inside the case and stored in the case.

9. The wire harness routing structure according to claim 1, wherein the wire harness is rewound inside the case and stored in the case.

10. The wire harness routing structure according to claim 2, wherein the wire harness is rewound inside the case and stored in the case.

11. The wire harness routing structure according to claim 3, wherein the wire harness is rewound inside the case and stored in the case.

12. The wire harness routing structure according to claim 1, wherein the base member is disposed under a door step.

* * * * *